May 11, 1965 A. A. FOSTER, JR., ETAL 3,182,805

TELEPHONE OFFICE MOUNTING PLATE

Filed April 11, 1962

INVENTOR.
ALLEN A. FOSTER, JR.
JOHN M. VELARDO
BY Angus & Mon
ATTORNEYS.

United States Patent Office 3,182,805

Patented May 11, 1965

3,182,805

TELEPHONE OFFICE MOUNTING PLATE

Allen A. Foster, Jr., 477 W. Loma Alta, and John M. Velardo, 495 W. Loma Alta, both of Altadena, Calif.

Filed Apr. 11, 1962, Ser. No. 186,672
14 Claims. (Cl. 211—26)

This invention relates to telephone central office equipment, and particularly to a mounting plate for use in central office mounting racks capable of providing universal mounting means for a wide range of types and sizes of circuit elements in a wide array of physical arrangements.

In telephone central offices, it is standard practice to install equipment on racks comprised of mounting plates which extend between upright members. The mounting plates are ordinarily specially notched and pierced to hold a pre-selected group of circuit elements in a predetermined geometric array. For routine installations with plenty of lead time for procuring the special plates, this is a suitable arrangement, but many occasions arise when lead time is insufficient, or in which the installation itself is so temporary that it ought not to bear the high overhead cost involved in making a custom mounting plate. Then it would be desirable to have a universal mounting plate which can be utilized to hold many types of circuit elements in a wide range of geometrical arrays.

Because central office equipment is permanent or semipermanent in nature, and reliability is an uppermost consideration, orderliness and neatness of the installation is necessary. Accordingly, it is an optional object of this invention to provide in a universal mounting plate, means for mounting the circuit elements which will hold them properly aligned in the pre-selected array.

Because a truly universal plate will require an extended slot, to the edges of which the circuit elements must be mounted, it is essential that, when the plate is loaded down with the circuit elements, it not deform and permit the circuit elements to fall off. One means is to make the base member of the mounting plate very heavy, but this involves cost and waste. It is therefore an optional object of the invention to provide a lightweight structure which can provide a rigid enough support to reliably hold its maximum design load.

A telephone office mounting plate according to this invention comprises an elongated base member which has a slot therethrough. A pair of parallel spaced-apart slot edges at least partially bound this slot. A support member which is wider than the slot overlaps both slot edges on one side of the base member. A retainer member is adapted to be attached to the support member on the other side of the base member at a location between the slot edges. It overlaps one of said slot edges. Fastener means draws the retainer member and support member toward each other, thereby mounting the support member to the base member and providing means for attaching circuit elements to the base member through the support member.

According to a preferred but optional feature of the invention, the base member, and one of the other members, are provided with a pair of engaging means which serve to prevent the slot edges from moving apart, and thereby prevent the type of base member distortion which would permit the support member, and with it the circuit elements, to fall off the base member.

According to a preferred but optional feature of the invention, the elongated base member has a pair of flanges, both of which include curved outer edges parallel to the slot. The retainer member includes a pair of curved lips adapted to overhang the curved edges and thereby serve both to hold the retainer member against cocking relative to the cocking in the slot, and to prevent slot edge separation.

The above and other features of this invention will be fully understood from the following detailed description and the accompanying drawings in which.

Figures 1, 2, 3, 4, 5, 6, 7, 8, 9:
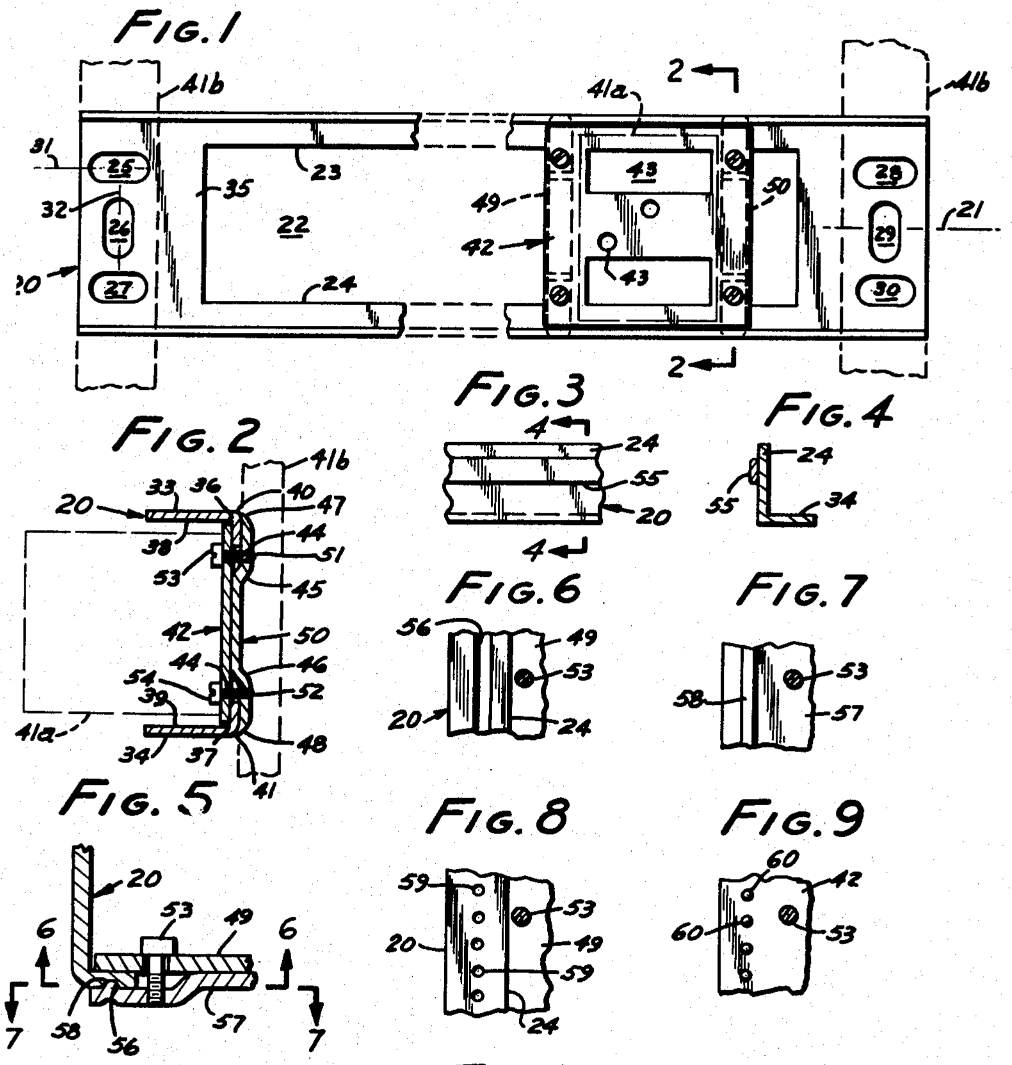
FIG. 1 is a plan view of the presently preferred embodiment of the invention.
FIG. 2 is a cross-section taken at line 2—2 of FIG. 1.
FIG. 3 is a fragmentary plan view of a portion of an alternate embodiment of the invention.
FIG. 4 is a cross-section taken at line 4—4 of FIG. 3.
FIG. 5 is a fragmentary cross-section of still another alternate embodiment of the invention.
Figures 10, 11:
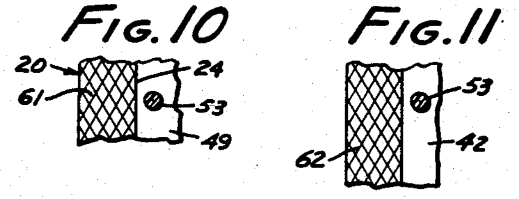
Figures 12, 13, 14:
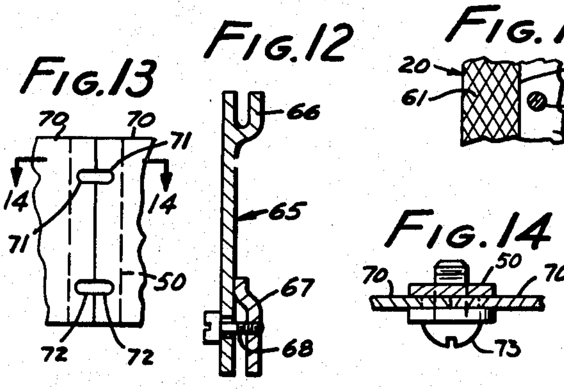

FIGS. 6 and 7 are cross-sections taken at lines 6—6 and 7—7, respectively, of FIG. 5;

FIGS. 8 and 9 are complementary plan views of portions of still another alternate embodiment of the invention;

FIGS. 10 and 11 are complementary plan views of still another embodiment of the invention;

FIG. 12 is a cross-section of still another embodiment of the invention;

FIG. 13 is a fragmentary plan view of still another alternate embodiment of the invention; and FIG. 14 is a cross-section taken at line 14—14 of FIG. 13.

In FIG. 1, there is illustrated an elongated base member 20 having a longitudinal axis 21. An axial slot 22 is formed in the base member and is partially bounded by a pair of slot edges 23, 24.

Six mounting holes 25–30 are formed in the mounting plate for attaching it to upright members in the central office. The mounting holes are elongated, and with particular respect to mounting holes 25 and 26, it will be noted that they have axes 31, 32 of elongation which are normal to each other. At least one pair of mounting holes in each of the two groups of holes are preferably so aligned, thereby enabling the plate to be cocked angularly as well as to be moved up, down and sidewise when mounting the mounting plate onto the uprights so that it can be accurately aligned.

The elongated base member includes a pair of flanges (flanges 33, 34, see FIG. 2) which join the central web 35 at coined corners 36, 37, so that substantially flat inner walls 38, 39 are formed immediately adjacent to the web. The outside of the base member is preferably formed with rounded outer edges 40, 41, which are parallel to the slot edges.

The base member is mounted in the position shown in FIG. 2, with the flanges away from the uprights 41*b*, and with the circuit elements 41*a* projecting outwardly from between the flanges of the base member. There is clearance between the flanges and the circuit elements to permit ready removal of their covers. This slot takes out a major proportion of the central web. The base member is preferably made of relatively thin metal. when many circuit elements, such as element 41*a*, are attached to the base member through means yet to be disclosed, it is evident that the base member will tend to buckle. Such buckling would involve the moving apart of slot edges 23 and 24, which would tend to drop the circuit elements. Therefore, when relatively thin metal is used, and large weights are to be supported, means should be provided to prevent slot edges 23 and 24 from moving apart. Such means form part of the preferred embodiment, and will be disclosed in detail below.

A support member 42 is formed with various cutout and hole portions 43, to which the circuit elements can be attached, and through which their terminals and connections can pass. There are four holes 44 to freely pass mounting screws.

The support member is wider (relative to axis 31)

than the lateral spacing between the slot edges so that it overhangs both slot edges and may be brought to bear against the elongated base member on both sides of the slot. Furthermore, its lateral edges may be cut square and abut the inside walls of the flanges to align the support member, if desired.

Two retainer members 49, 50 are placed on the other side of the central web from the support member and they, too, are of width (relative to axis 31) greater than the lateral spacing between the slot edges so that they overhang both of them.

The retainer members have holes 51, 52 therethrough to pass fastener means comprising headed screws 53, 54. The fasteners pass freely through holes 44, respectively, and thread into holes 51, 52, so that tightening down the screws draws the heads of the screws against the support member, thereby drawing the retainer member and support member toward each other and clamping the elongated base member between them. This holds the support member attached to the base member in condition to receive and support circuit elements, such as element 41*a*.

Two joggles 45, 46 are provided on each retainer member. They form lips 47, 48, which are offset from the central part of the retainer members. The retainer members, like the support member, are wider (relative to axis 31) than the slot so as to overhang both sides of the slot.

The lips are curved to embrace rounded edges 40, 41, thereby to aid in gripping and aligning the retainer and support members relative to the base member.

Alternate means may be provided for preventing cocking of the support member in the slot besides the lips shown in FIG. 2. One such example is shown in FIGS. 3 and 4. In FIG. 3, there is shown a fragment of elongated base member 20 with the addition of an alignment bar 55, which is spot-welded or otherwise affixed to the central web. It is parallel to axis 21. When such an alignment bar is provided, the support member or retainer member would terminate without a curved lip, but instead with a flat, straight edge adapted to abut the alignment bar and the assembly would thereby be prevented from cocking by the contact between either the retainer or support member with the bar. This arrangement does not, however, include means specifically intended to keep the slot edges from spreading apart.

FIGS. 5, 6 and 7 show an elongated base member 20 modified by the inclusion of an axially-extending groove 56 in its central web, and in which a support member 57, identical in all other respects to support member 42, is provided with an axially-extending ridge 58 adapted to fit into groove 56. A groove and a ridge are provided for each side of the slot. When a retainer member, such as member 49, and support member 57 are drawn together by a screw 53, the central web at each side of the slot is tightly gripped to keep the slot edges from spreading apart, and also the support member is accurately aligned.

FIG. 8 illustrates a fragment of an elongated base member 20 modified by the inclusion of a plurality of dimples 59 extending axially along the central web. A support member 42 is modified by the inclusion of a plurality of equally spaced pips 60 spaced along it. The pips and dimples are adapted to enter into each other and prevent cocking and spreading in the same manner as the ridges and grooves in FIGS. 5–7.

FIGS. 10 and 11 illustrate the use of a frictional surface to prevent or minimize cocking and spreading. The frictional surface shown in FIGS. 10 and 11 comprises a knurled surface 61 extending along elongated base member 20 adjacent the slot edge. A support member 42 is modified with a knurled surface 62, which is adapted to overlay and contiguously abut surface 61. Frictional surfaces other than knurls could be used instead, such as sandblasted or otherwise roughened surfaces, knurls constituting merely an example of an easily-manufactured frictional surface.

The embodiment of FIG. 12 illustrates that a support member 65 may include a retainer member 66 as an integral part at one of its ends and a retainer member 67 affixed thereto by a screw 68 at the other of its ends, still attaining the full results of any of the other embodiments.

FIG. 13 shows a means for saving lateral space in the slot by joining two adjacent support members to a single retainer member with a single set of screws. The additional width of support member which would be taken up by edge distance for the holes in the retainer and support members can thereby be eliminated. Support members 70, identical in all other respects to support member 42, have slotted holes 71, 72 opening at their edges. A retainer member, identical to member 50, overlaps the edges of both support members 70. A washer-head screw 73 passes through holes 71 and 72, the head overlapping the support members, and threads into the hole in the retainer member, thereby holding both support members to the single retainer member. Holes 71 and 72 need be no more than half a full hole, if desired.

The use of the embodiments will now be described. The elongated base member is readily attached to uprights by passing fasteners through the various mounting holes, selecting them with respect to the amount of angular, vertical or horizontal adjustment required to place it in perfect alignment with other surrounding equipment. After the elongated base member is in place, it is conventional to remove one of the screws from each of the retainer members, so that the support member may easily be positioned with the retainer members on the back sides. Then the other screws are inserted, and once the support member is properly positioned, they are all tightened down.

For lightweight installations, it is not necessary to provide means to prevent spreading apart of the slot edges, because the weight carried by the elongated base member will not be sufficient to deform it enough to release the members. However, when weights to be held are relatively larger, the other features shown in the drawings become of considerable advantage. For example, in FIG. 2, when the retainer member and support member are drawn together, the lips overhang and embrace the curved outer edges of the elongated base member and thereby act as a clamp preventing the lateral separation of the slot edges as well as preventing the cocking of the support member. Thus, no matter how heavy the weight is, within generous limits, any deformation of the base member will still not permit the slot edges to spread apart far enough to let the members fall out.

The embodiments of FIGS. 3 and 4 provide only the advantage of keeping the support member aligned. It would permit expulsion or the dropping of the support and retainer members should the elongated base member be sufficiently deformed.

The embodiment of FIGS. 5–7 provides both advantages, because the engagement between the ridge and the groove, which will be provided incidentally adjacent to both slot edges, provides a clamping action which prevents the slot edges from being pried apart.

The embodiments of FIGS. 8–9 and 10–11 include all the advantages and perform their functions substantially the same as that of FIGS. 5–7. In every case, the dimples and pips, or the frictional surfaces are provided adjacent to both of the slot edges.

FIG. 12 is merely a simplified arrangement showing that the inclusion of both a single, clampable, retainer member-support member arrangement at one end is ample for many embodiments of the invention and lie within its scope.

The reversal of parts in the various embodiments is obvious and falls within the scope of the invention. For example, the groove and ridge in FIG. 5 could be placed on the opposite members, as could the lips and curves of FIG. 1, and the dimples of pips of FIG. 8.

This invention thereby provides a means for readily setting up central office equipment in a wide variety of arrangements, and with a large number of circuit possibilities, and which, in the preferred embodiment, inherently aligns the devices and prevents their falling out should the elongated base member be distorted by too much weight attached thereto.

An alternate means for aligning the device is indicated in FIG. 2 wherein the lateral outermost ends of the retainer members are straight, and lie parallel to and contiguous with the inner walls of the flanges, which thereby prevent cocking of the units in the slot. This feature could be combined with the embodiment of FIG. 10 (or any of the embodiments), to make the support members self-aligning as well as to resist cocking.

This invention is not to be limited by the embodiments shown on the drawings and described in the description which are given by way of example and not of limitation, but only in accordance with the scope of the appended claims.

We claim:

1. A telephone office mounting plate adapted to be mounted to fixed structure, comprising: an elongated base member having an axis, and an axial slot therethrough; a pair of parallel, spaced-apart slot edges bounding the slot; a support member wider than the slot whereby to overlap both slot edges on one side of the base member; a retainer member separate from the base member and adapted to be attached to the support member at a location between the slot edges, and to overlap one of said slot edges on the other side of the base member from the support member; fastener means for drawing the retainer member and the support member toward each other to clamp one of the slot edges between them, thereby attaching the support member to the base member, the support member thereby providing means for attaching circuit elements to the base member, and thus to the fixed structure.

2. Apparatus according to claim 1 in which the base member has an outer edge parallel to the slot edges, and in which one of the other members includes a lip which overhangs the outer edge to align the support member in the slot.

3. Apparatus according to claim 1 in which the base member has a pair of outer edges parallel to the slot edges, and in which the retainer member includes a pair of lips, each of which overhangs a respective one of the outer edges to prevent the slot edges from spreading apart.

4. Apparatus according to claim 1 in which the base member is provided with a plurality of mounting holes therethrough, said holes being elongated, the axes of elongation of the holes of at least one pair of said holes being normal to each other.

5. Apparatus according to claim 3 in which the retainer member is provided with a pair of joggles which are so disposed and arranged as to position at least a part of that portion of the support member which overlays the slot between the slot edges within the slot when the support member and the elongated base member outside the slot are contiguous.

6. Apparatus according to claim 1 in which an alignment bar extends axially along said base member, which bar is spaced from and parallel to one of said slot edges, whereby to abut one of the other members, thereby to align it.

7. Apparatus according to claim 1 in which one of the base member and support member is provided with an axially-extending groove and the other is provided with an axially-extending ridge, said ridge being adapted to extend into the groove to align the support member.

8. Apparatus according to claim 7 in which a pair of said ridges and grooves are provided, one pair being adjacent to each of the slot edges, whereby to prevent lateral separation of the slot edges.

9. Apparatus according to claim 1 in which at least some contiguous surfaces of the base member and the support member are frictionally surfaced, whereby to prevent lateral separation of the groove edges.

10. Apparatus according to claim 9 in which the frictional surfacing comprises knurling.

11. Apparatus according to claim 1 in which the support member and retainer member are integral at one end of the support member to form a bifurcated structure adapted to straddle one of said slot edges.

12. Apparatus according to claim 1 in which a pair of support members are provided, each having axial slotted holes at the adjacent edges, and in which the fastener means comprises a headed screw adapted to thread into a single retainer member which overlaps both support members, the head of the screw overlapping both support members, whereby portions of two support members are held by a single retainer member.

13. Apparatus according to claim 1 in which the retainer member overlaps both slot edges, and in which the fastener means provide for drawing the retainer member and support member toward each other at both edges of the slot so that the support member is attached to the base member at both slot edges.

14. Apparatus according to claim 13 in which a pair of retainers is provided, said retainers being spaced apart from each other to create four points of attachment to the base member, and in which one of said fastener means is provided adjacent to each of said points of attachment.

References Cited by the Examiner

UNITED STATES PATENTS

| | | | |
|---|---|---|---|
| 1,412,556 | 4/22 | Earnshaw | 78—54 |
| 1,725,277 | 8/29 | Johnson | 189—36 |
| 2,189,159 | 2/40 | Anschicks | 189—36 |
| 2,194,113 | 3/40 | Covell | 189—84 |
| 2,268,636 | 1/42 | Becker | 189—36 |
| 2,486,764 | 11/49 | Singer | 312—223 X |
| 2,614,157 | 10/52 | Montgomery | 317—119 |
| 2,685,876 | 8/54 | Sanderson | 287—54 X |
| 2,796,959 | 1/57 | Toney | 189—36 |
| 2,990,920 | 7/61 | Hoffman | 189—34 |
| 3,019,035 | 1/62 | Klompas | 189—36 |

FOREIGN PATENTS

| | | |
|---|---|---|
| 117,824 | of 43 | Australia. |
| 446,807 | of 36 | Great Britain. |

CLAUDE A. LE ROY, *Primary Examiner.*